US010144035B1

(12) United States Patent
Morozov et al.

(10) Patent No.: US 10,144,035 B1
(45) Date of Patent: Dec. 4, 2018

(54) LOW-FREQUENCY SOUND SOURCE FOR UNDERWATER SOUND PROPAGATION RESEARCH AND CALIBRATION

(71) Applicant: Teledyne Instruments, Inc., Thousand Oaks, CA (US)

(72) Inventors: Andrey K. Morozov, North Falmouth, MA (US); Douglas C. Webb, Falmouth, MA (US)

(73) Assignee: TELEDYNE INSTRUMENTS, INC., Thousand Oaks, CA (US)

( * ) Notice: Subject to any disclaimer, the term of this patent is extended or adjusted under 35 U.S.C. 154(b) by 0 days.

(21) Appl. No.: 15/684,767

(22) Filed: Aug. 23, 2017

(51) Int. Cl.
| | | |
|---|---|---|
| *H04R 3/02* | (2006.01) | |
| *B06B 1/02* | (2006.01) | |
| *H01F 21/00* | (2006.01) | |
| *H01F 27/28* | (2006.01) | |

(52) U.S. Cl.
CPC ......... *B06B 1/0207* (2013.01); *H01F 21/005* (2013.01); *H01F 27/2823* (2013.01)

(58) Field of Classification Search
CPC . B06B 1/0207; H01F 21/005; H01F 27/2823; H01F 21/04; H01F 21/065
See application file for complete search history.

(56) References Cited

U.S. PATENT DOCUMENTS

| | | | | |
|---|---|---|---|---|
| 5,087,850 A | * | 2/1992 | Suzuta | ............... B06B 1/0207 310/316.01 |
| 5,198,713 A | * | 3/1993 | Suzuta | ............... B06B 1/0207 310/316.01 |
| 8,120,457 B2 | | 2/2012 | Hu et al. | |
| 2007/0296393 A1 | * | 12/2007 | Malpas | ............... A61B 5/0002 323/355 |
| 2011/0248812 A1 | * | 10/2011 | Hu | ......................... H01F 29/14 336/221 |
| 2015/0062214 A1 | * | 3/2015 | Kashimura | ............ B41J 2/0459 347/9 |

OTHER PUBLICATIONS

Medini et al., "A Current-Controlled Variable-Inductor for High Frequency Resonant Power Circuits", 9th Annual Applied Power Electronics Conference and Exposition, 1994, vol. 1, pp. 219-225.

* cited by examiner

*Primary Examiner* — Bryan Gordon
(74) *Attorney, Agent, or Firm* — K&L Gates LLP

(57) ABSTRACT

A variable inductor includes a three-limbed core first section having an inductor winding wound about a medial limb. An air gap is disposed in the medial limb. The inductor includes a second section having a control limb in which a first end of the control limb is connected to a first outer limb of the three-limbed core, and a second end of the control limb is connected to a second outer limb of the three-limbed core. A control winding is wound about the control limb. The inductor may be used in a control circuit to control a power signal driving a transducer. The inductor may be controlled by a signal derived from a comparison of a voltage phase of a power signal to the transducer and a phase of the current traversing the transducer. A system may include the control circuit, including the variable inductor, and the transducer.

22 Claims, 10 Drawing Sheets

LOW-FREQUENCY SOUND SOURCE FOR UNDERWATER SOUND PROPAGATION RESEARCH AND CALIBRATION

BACKGROUND

Underwater acoustic sources may have a number of different applications including, for example, marine geology, acoustic oceanography, ocean acoustic tomography, underwater positioning and navigation, underwater communications, and sound propagation research. Among these traditional oceanographic applications the sound sources may be used to measure sea water parameters such as, for example, ocean temperature and currents. Further applications may include the measurement of ocean floor characteristics such as, for example, an acoustic bottom impedance. Additional applications may also include, without limitation, positional measurements of underwater instruments, research experiments on underwater sound propagation, and testing and calibration of underwater acoustic receiver arrays.

Underwater acoustic sources located, for example, at the ocean floor, may be advantageously used for determining bottom sediment acoustic properties. Measurement of such sediment acoustic properties may be desirable for developing and using low and mid frequency sonar devices in shallow water. For such purposes, a sound source may be placed on a moving underwater autonomous vehicle (UAV) to study sound propagation in shallow water or for use in a moving target source to test and calibrated underwater survival systems.

In all such uses, a desirable sound source should be compact and efficient, use little power, and emit a well calibrated, highly frequency-coherent signal over a large frequency band. Such characteristics may be especially desirable for an underwater sound source deployed for extended periods of time.

BRIEF SUMMARY

In one aspect, a variable inductor may include a first core and a second core. The first core may include a first outer limb, a second outer limb, a medial limb disposed between the first outer limb and the second outer limb, a first framing portion coupled to a first side of the first outer limb, a first side of the second outer limb, and a first side of the medial limb, a second framing portion coupled to a second side of the first outer limb and a second side of the second outer limb, an air gap disposed between a second side of the medial limb and the second framing portion, and a variable inductor winding wound on the medial limb. The second core may include a control core limb, and a control winding wound on the control core limb. A first side of the control core limb may be coupled to the first outer limb and a second side of the control core limb may be coupled to the second outer limb.

In an aspect of the variable inductor, the first outer limb, the second outer limb, and the medial limb define a first plane and the control core limb is disposed on a second plane orthogonal to the first plane.

In an aspect of the variable inductor, the first side of the control core limb may be coupled to a medial portion of the first outer limb and the second side of the control core limb may be coupled to a medial portion of the second outer limb.

An aspect of the variable inductor may further include a first permanent magnet disposed between the control core limb and the first outer limb, and a second permanent magnet disposed between the control core limb and the second outer limb.

In an aspect of the variable inductor, the first permanent magnet has a first magnetization direction, the second permanent magnet has a second magnetization direction, and the first magnetization direction of the first permanent magnet is the same as the second magnetization direction of the second permanent magnet.

In one aspect, a control system for a transducer may include a controller configured to transmit a transducer signal and a control signal, and to receive a return signal, an amplifier configured to receive the transducer signal and transmit a power signal that may depend at least in part on the transducer signal, a variable inductor, and a phase comparator configured to transmit to the controller a comparison signal. The variable inductor may be configured to receive the power signal at an inductor input, transmit an inductor signal at an inductor output, and adjust an electrical characteristic of the inductor signal depending at least in part on the control signal. Further, the comparison signal may depend at least in part on a comparison of a first signal indicative of a voltage phase of the power signal with a second signal indicative of a current phase of the return signal. In addition, the control signal may depend at least in part on the comparison signal.

In one aspect of the control system the transducer signal may be a frequency modulated signal.

In one aspect of the control system, the frequency modulated signal is modulated in a frequency range of 500 Hz to 1000 Hz.

In one aspect of the control system, the electrical characteristic of the inductor signal is a voltage phase of the inductor signal.

In one aspect of the control system the controller is configured to transmit a control signal that, upon receipt of the control signal by the variable inductor, minimizes a difference between the first signal and the second signal.

In one aspect of the control system, the variable inductor may include a first core and a second core. The first core may include a first outer limb, a second outer limb, a medial limb disposed between the first outer limb and the second outer limb, a first framing portion coupled to a first side of the first outer limb, a first side of the second outer limb, and a first side of the medial limb, a second framing portion coupled to a second side of the first outer limb and a second side of the second outer limb, an air gap disposed between a second side of the medial limb and the second framing portion, and a variable inductor winding wound on the medial limb. The second core may include a control core limb, and a control winding wound on the control core limb. A first side of the control core limb may be coupled to the first outer limb and a second side of the control core limb may be coupled to the second outer limb.

In one aspect of the control system, the first end of the variable inductor winding is configured to receive the power signal and the first end of the control winding is configured to receive the control signal.

In one aspect of the control system, the controller is electrically coupled to the second end of the control winding.

In one aspect, a system may include a transducer, a controller configured to transmit a transducer signal and a control signal, and to receive a return signal, an amplifier configured to receive the transducer signal and transmit a power signal that may depend at least in part on the transducer signal, a variable inductor, and a phase comparator configured to transmit to the controller a comparison signal. The variable inductor may be configured to receive the power signal at an inductor input, transmit an inductor signal at an inductor output, and adjust an electrical characteristic of the inductor signal depending at least in part on the control signal. Further, the comparison signal may depend at least in part on a comparison of a first signal indicative of a voltage phase of the power signal with a second signal indicative of a current phase of the return signal. In addition, the control signal may depend at least in part on the comparison signal.

In one aspect of the system, the electrical characteristic of the inductor signal comprises a voltage phase of the power signal.

In one aspect of the system, the controller is configured to transmit a control signal that, upon receipt of the control signal by the variable inductor, minimizes a difference between the first signal and the second signal.

In one aspect of the system, the variable inductor is configured to minimize a difference between the voltage phase of the inductor signal and the current phase of the return signal from the transducer upon receipt, by the variable inductor, of the control signal from the controller.

In one aspect of the system, the variable inductor may include a first core and a second core. The first core may include a first outer limb, a second outer limb, a medial limb disposed between the first outer limb and the second outer limb, a first framing portion coupled to a first side of the first outer limb, a first side of the second outer limb, and a first side of the medial limb, a second framing portion coupled to a second side of the first outer limb and a second side of the second outer limb, an air gap disposed between a second side of the medial limb and the second framing portion, and a variable inductor winding wound on the medial limb. The second core may include a control core limb, and a control winding wound on the control core limb. A first side of the control core limb may be coupled to the first outer limb and a second side of the control core limb may be coupled to the second outer limb.

In one aspect of the system, the first end of the variable inductor winding is configured to receive the power signal and the second end of the variable inductor winding is configured to transmit the inductor signal to an input of the transducer.

In one aspect of the system, the first end of the control winding is configured to receive the control signal.

In one aspect of the system, the controller is electrically coupled to the second end of the control winding.

In one aspect, a method of controlling a transducer may include transmitting, by a controller, a transducer signal to an amplifier, wherein the amplifier, in response to receiving the transducer signal, transmits a power signal to a variable inductor having a variable inductor output electrically coupled in series with an input of the transducer, receiving, by the controller, a return signal from an output of the transducer, receiving, by the controller, a comparison signal from a phase comparator, wherein the comparison signal depends at least in part on a comparison of a first signal indicative of a voltage phase of the power signal with a second signal indicative of a current phase of the return signal from the output of the transducer, and transmitting, by the controller, a control signal to the variable inductor, wherein the variable inductor, in response to receiving the control signal, adjusts an electrical characteristic of an output signal of the variable inductor.

In one aspect of the method, transmitting, by a controller, a transducer signal to an amplifier may include transmitting, by a controller, a frequency modulated signal to an amplifier.

An aspect of the method may further include modulating, by the controller, the frequency modulated signal in a frequency range of 500 Hz to 1000 Hz.

In one aspect of the method, transmitting, by the controller, a control signal to the variable inductor in which the variable inductor, in response to receiving the control signal, adjusts an electrical characteristic of an output signal of the variable inductor includes transmitting, by the controller, the control signal to the variable inductor, in which the variable inductor, in response to receiving the control signal, adjusts a voltage phase of the output signal of the variable inductor.

In an aspect of the method, transmitting, by the controller, a control signal to the variable inductor, in which the variable inductor, in response to receiving the control signal, adjusts a voltage phase of the output signal of the variable inductor may include transmitting, by the controller, the control signal to the variable inductor, in which the variable inductor, in response to receiving the control signal, adjusts the voltage phase of the output signal of the variable inductor thereby minimizing the comparison signal.

The details of one or more implementations are set forth in the accompanying drawings and the description below. Other features and advantages will become apparent from the description, the drawings, and the claims.

DETAILED DESCRIPTION

There is a demand for a low-power but efficient deep water sound sources for in situ calibration and positioning of an underwater acoustical array as well as estimating the actual geometric configuration (shape) of the array. Such a sound source can also be used as a target source for testing deep sea detection systems along with a variety of investigations of sound propagation under complex sea conditions. An efficiently radiating sound source can be achieved using a transducer working at or near its resonant frequency. If the sound frequency emitted by the transducer is less than 1000 Hz, the underwater wavelength may be greater than about 1.5 meters. An acoustical source operating at resonance at such frequencies may therefore be too large for practical purposes. However, if the sound pressure level is limited, the sound waves that can be emitted from an acoustic source operating under non-resonant conditions may have smaller wavelengths than those of a sound source operating at resonance.

In some non-limiting examples, sound sources or transducers, such as piezo-ceramic spheres or oil filled symmetrical Tonpilz resonators, can radiate sound up to 160 dB SPL re 1 uPa at 1 m in the frequency range 500-1000 Hz. A piezo-ceramic transducer, which can be modeled by a parallel resistor/capacitor network, may have a very low efficiency when operating in a non-resonant mode due to a large current flow through its equivalent network capacitor. This capacitive current flow may be the main source of loss. For efficient radiation of sound at frequencies much lower than the resonant frequency, a compensation circuit may be added either parallel to or in series with the transducer. In some aspects, such a compensation circuit may include an inductor tuned in resonance with the piezo-ceramic equivalent circuit capacitor. The addition of such a compensation circuit to the transducer may result in a reasonable efficiency (of about 25% and higher) when the circuit is operated at frequencies close to resonance.

Figure 1:
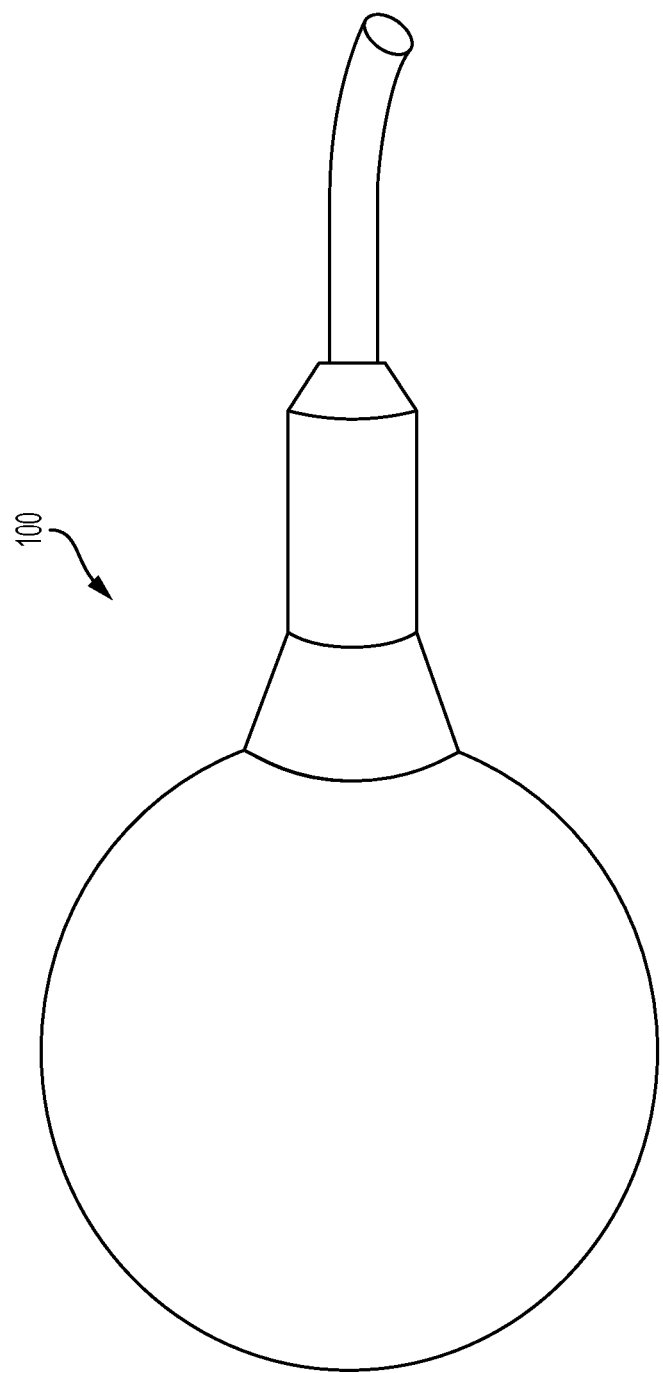
FIG. 1 depicts an aspect of a spherical omnidirectional piezo-ceramic transducer.

Without being bound by theory, a piezo-ceramic spherical transducer operating in a non-resonant mode may be modeled by an electrical circuit including a radiating resistor $R_t$ coupled in parallel to an internal capacitor $C_t$. FIG. 1 depicts an example of a spherical omnidirectional piezo-ceramic transducer 100. When the transducer is operated at a frequency far from resonance, the equivalent radiation resistor $R_t$ can be very large and thus conduct only a small portion of current flowing through the transducer, while a greater amount of current may flow through the capacitor $C_t$. The current flowing through the internal capacitor $C_t$ is shifted in phase by +90 degrees relative to input voltage signal. The resulting phase shift may significantly reduce the efficiency of the transducer (for example to less than 1%). To compensate for the capacitive phase shift, a phase compensating inductor, tuned in resonance with the transducer capacitor, may be connected in series or in parallel with the transducer. The addition of such a phase compensating inductor may increase the efficiency of the transducer, but only within a very narrow band of frequencies near the transducer resonance.

A frequency modulated signal sweeping over a wide frequency range is commonly used for the calibration and in the research of the sound propagation effects. As disclosed above, a simple compensating inductor may compensate the phase off-set for only a narrow range in frequencies. In order to calibrate a sound source over a wide range of frequencies, it would be useful to create an electrical circuit capable of compensating the phase offset for the range of frequencies required for calibration. Disclosed below and in the accompanying figures is an electrically tunable phase compensation circuit that includes a variable inductor controlled by an electric current.

Figure 2:
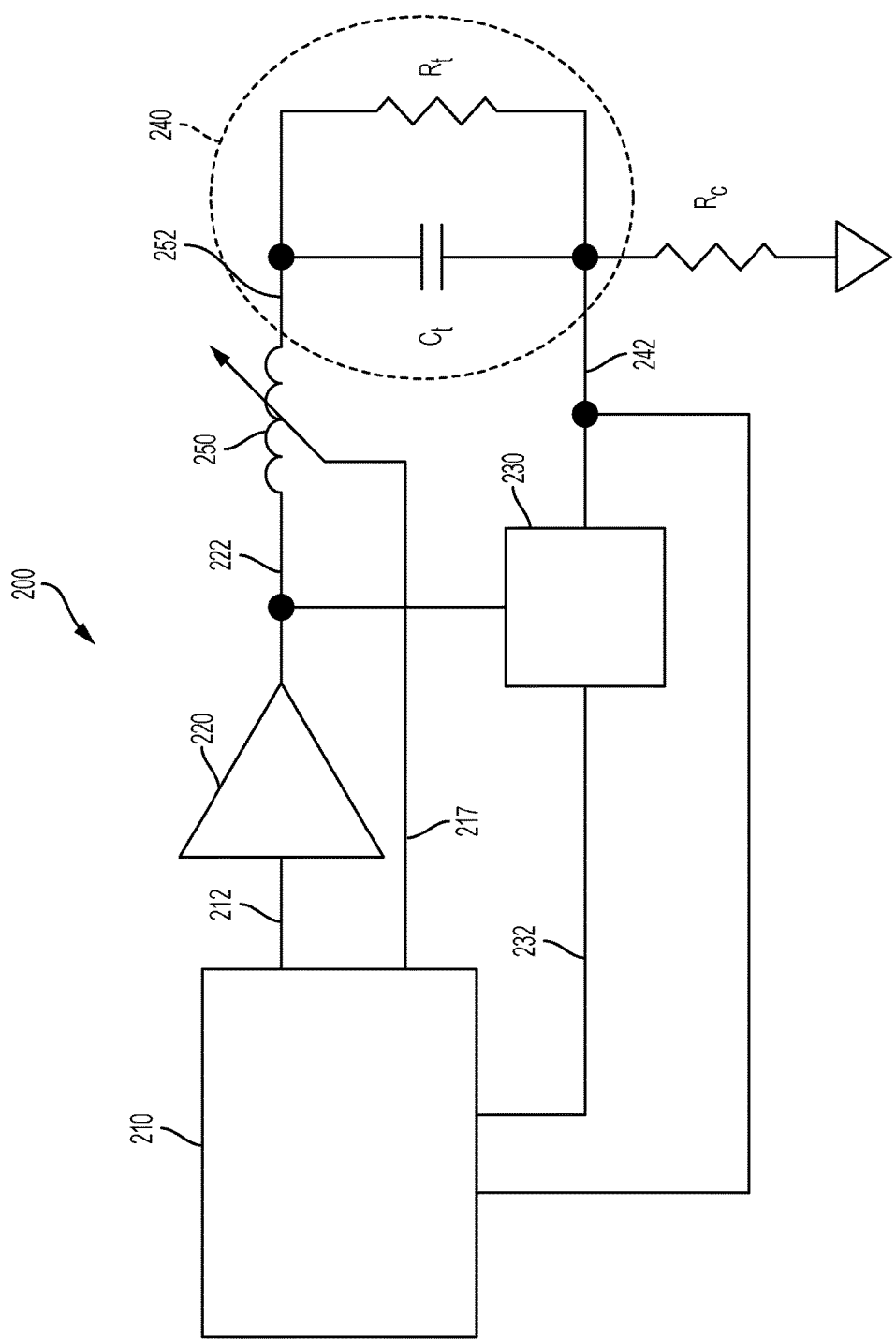
FIG. 2 is an electrical schematic of an aspect of a system for the control of a piezo-ceramic transducer.

One aspect of a phase compensation circuit is depicted schematically in FIG. 2. The compensation circuit 200 may include a controller 210 configured to source a transducer signal 212 to a power amplifier 220. The power amplifier 220 may, in turn, source a power signal 222 to a variable inductor 250 and to a phase comparator 230. The variable inductor 250 may receive a control signal 217 from controller 210, and transmit an inductor signal 252 to an input of a transducer 240. As disclosed above, the transducer 240 may be represented in an electrical circuit by an internal capacitor $C_t$ connected in parallel to a radiating transducer resistor $R_t$. An output of the transducer 240 may be connected to ground via a small resistor $R_c$. As a result of small resistor $R_c$, the current through the transducer 240 may be converted to a voltage signal 242 indicative of the current passing through the transducer 240. Although the voltage signal 242 indicative of the current passing through the transducer 240 may be determined by the use of small resistor $R_c$, it may be recognized that other current sensors such as an inductor sensor or Hall-effect sensor may be used to provide the voltage signal 242 indicative of the current passing through the transducer 240.

The voltage signal 242 indicative of the current passing through the transducer 240 may also be transmitted to the phase comparator 230 as well as directly to the controller 210. The phase comparator 230 may output a comparison signal 232 to the controller 210. The comparison signal 232 may be indicative of a difference between a phase of the power signal 222 voltage and a phase of the voltage signal 242 indicative of the current passing through the transducer 240. The controller 210 may transmit a control signal 217 configured to adjust the inductance of inductor 250. The control signal 217 may depend at least in part on the comparison signal 232 transmitted to the controller by the phase comparator 230.

The transducer signal 212 generated by the controller 210 may be an AC signal having a single carrier frequency. Alternatively, the transducer signal 212 may have a carrier frequency that is swept in a frequency range between about 500 Hz to about 1000 Hz. It may be understood that the swept frequency range of about 500 Hz to about 1000 Hz is non-limiting, and the frequency range may be within any suitable range for calibration purposes. Further non-limiting examples of a frequency range may be a range between about 500 Hz to about 600 Hz, about 600 Hz to about 700 Hz, about 700 Hz to about 800 Hz, about 800 Hz to about 900 Hz, about 900 Hz to about 1000 Hz, or any combination or combinations of ranges thereof.

The transducer 240 is presented by an equivalent electrical circuit with its capacitor $C_t$ and radiating resistor $R_t$. The system 200 may tune an inductance value of the inductor 250 by means of the control signal 217 so that the combined inductance value of the inductor 250, capacitance value of the transducer capacitor $C_t$, and resistance value of the transducer resistor $R_t$ together form a resonant circuit at the frequency of transducer signal 212. In some aspects, the control signal 217 may be an output signal of a phase locked loop (PLL) composed of the phase comparator 230 and the controller 210. Thus, the control signal 217 may control an inductance value of the inductor 250 to minimize the phase difference between the phase of the power signal 222 voltage and the phase of the voltage signal 242 indicative of the current passing through the transducer 240.

It may be recognized that a resonance condition of the inductor 250, transducer internal capacitor $C_t$ and transducer radiating resistor $R_t$ will occur when the phase of the power signal 222 voltage and the phase of the voltage signal 242 indicative of the current passing through the transducer 240 are about equal. Under such conditions, the comparison signal 232 will be about zero. If the comparison signal 232 is positive, the resonant frequency of an LCR circuit having the combined values of the inductor 250, internal capacitor $C_t$, and radiating resistor $R_t$ is higher than the frequency of transducer signal 212 and the PLL will decrease the control signal 217 current to increase the inductance of inductor 250 thereby lowering the resonant frequency of the LCR circuit. Alternatively, if the comparison signal 232 is negative, the resonant frequency of an LCR circuit having the combined values of the inductor 250, internal capacitor $C_t$, and radiating resistor $R_t$ is smaller than the frequency of transducer signal 212, and the PLL will increase the control signal 217 current to lower the inductance value of inductor 250 and thereby increase the resonant frequency.

The radiated sound pressure from the transducer 240 is proportional to the current through the transducer 240 or to the voltage signal 242 indicative of the current passing through the transducer 240. When the amplitude of the current through transducer 240 decreases, the controller 210 may increase the amplitude of the transducer signal 212 transmitted to the amplifier 220. Similarly, when the amplitude of the current through transducer 240 increases, the controller 210 may decrease the amplitude of the transducer signal 212 transmitted to the amplifier 220. By adjusting the current through the transducer 240, the controller 210 can maintain the power radiated by the transducer 240 at a required level over an entire range of frequencies swept by the controller 210. By controlling the inductance of variable inductor 250, the controller 210 may be able to compensate the frequency dependent phase shift of the current through the transducer 240 due to the internal capacitor $C_t$.

Any kind of a volume velocity type transducer can be used to radiate sound pressure wave at the low frequency below resonance. In one aspect, a transducer 240 may include a spherical omnidirectional piezo-ceramic transducer 100, as depicted in FIG. 1. A non-limiting example of such a transducer may be one supplied by International Transducer Corporation (for example, model number ITC-1007). In some non-limiting examples, the internal transducer capacitor $C_t$ may have a capacitance of about 100 nF. A frequency dependent signal phase shift due to the internal capacitor $C_t$ of such a transducer 240 may be precisely compensated by a variable inductor. In some non-limiting examples, the efficiency of such transducer can be greater than 25% over the entire band when suitably compensated by the variable inductor. Table 1 presents exemplary values of sound pressure levels generated by a transducer at a variety of input frequencies when properly compensated.

TABLE 1

| Input Signal Frequency (at 1000 V RMS) | Sound Pressure Level (re 1 µPa at 1 Meter) |
| --- | --- |
| 300 Hz | 150 dB |
| 500 Hz | 155 dB |
| 750 Hz | 160 dB |
| 1000 Hz | 165 dB |
| 1500 Hz | 173 dB |
| 2500 Hz | 180 dB |

As disclosed above, a compensation circuit 200 may include a variable or controllable inductor 250. In some aspects, the variable inductor 250 may include an inductor coil wound around one or more inductor sections or limbs of the one or more magnetic cores. An inductor magnetic flux may flow through one or more closed flux paths within the core. In addition, the inductor sections or limbs may include one or more air gaps. An air gap introduced in the inductor flux path may increase the saturation limit for the coil current and hence increase the maximum inductor output power.

The variable inductor 250 may also include a control coil that may be wound around one or more control sections or limbs of the one or more magnetic cores. A control current induced in the control coil may result in a control magnetic flux that may flow through one or more closed flux paths along the control sections or limbs of the magnetic core. In some aspects, the control sections or limbs of the core may lack any air gaps. The lack of air gaps in the control sections or limbs of the magnetic core may result in increased sensitivity of the variable inductor to the control magnetic flux, thereby increasing the efficiency of the control current. Further, the control sections or limbs, lacking any air gaps, may require less current to control the variable inductor than control sections having air gaps. In one aspect, the inductor magnetic flux flows through the inductor sections or limbs having air gaps while the control magnetic flux flows mostly through the sections of the magnetic core lacking such air gaps.

One aspect of a variable inductor is described in U.S. Pat. No. 8,120,457 entitled "Current-Controlled Variable Inductor" issued to Yuequan Hu et al. (hereafter, "Hu"). Some teachings regarding an aspect of a variable inductor may also be found in D. Medini and S. Ben-Yaakov, *A Current-Controlled Variable Inductor for High Frequency Resonant Power Circuits*, vol. 1 PROC. 9TH ANNUAL IEEE APPLIED POWER ELECTRONICS CONFERENCE (APEC) 219 (1994) (hereafter, "Medini").

Figure 3A:
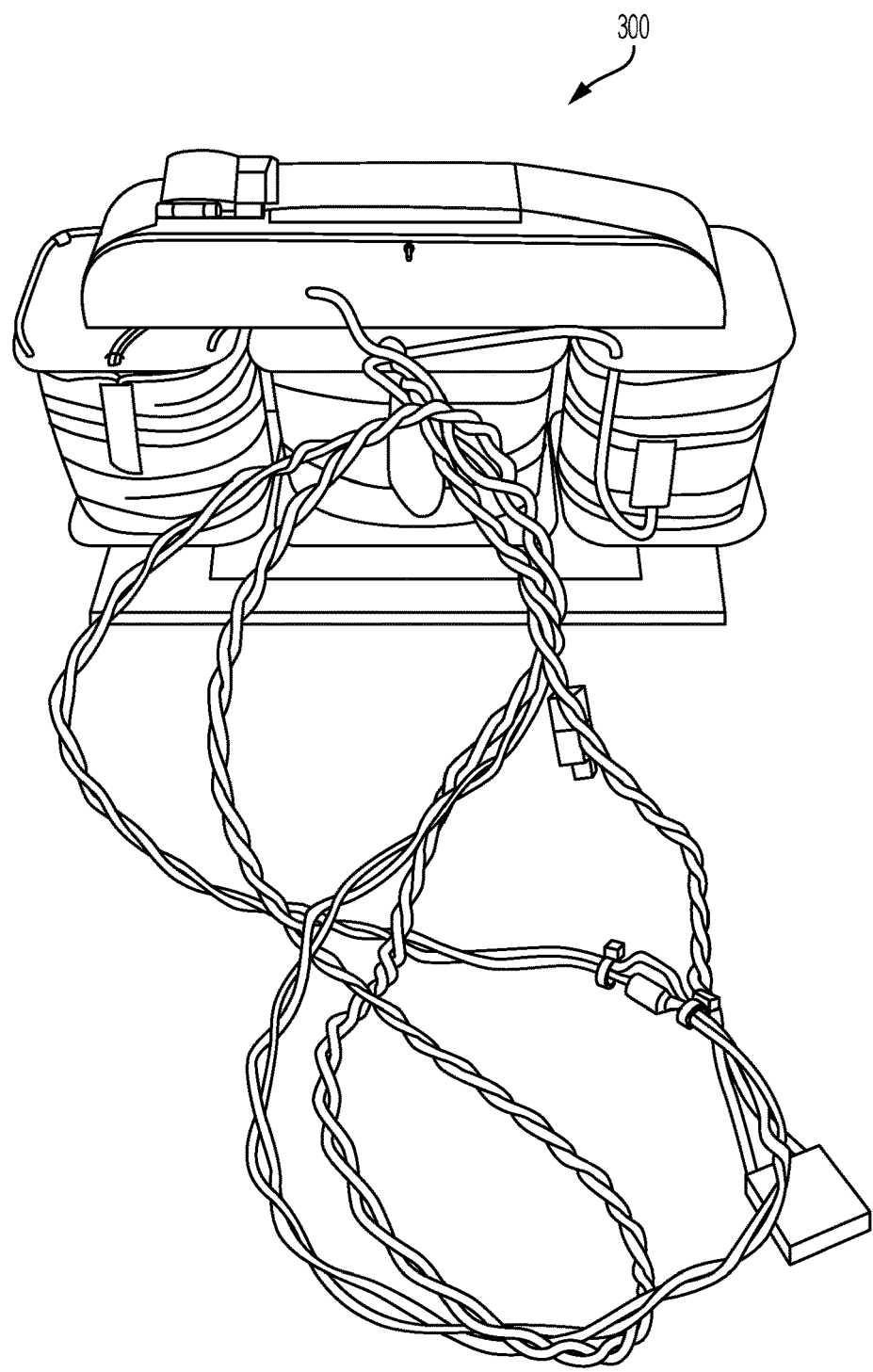
FIG. 3A depicts a realized example of one aspect of a variable inductor.
Figure 3B:
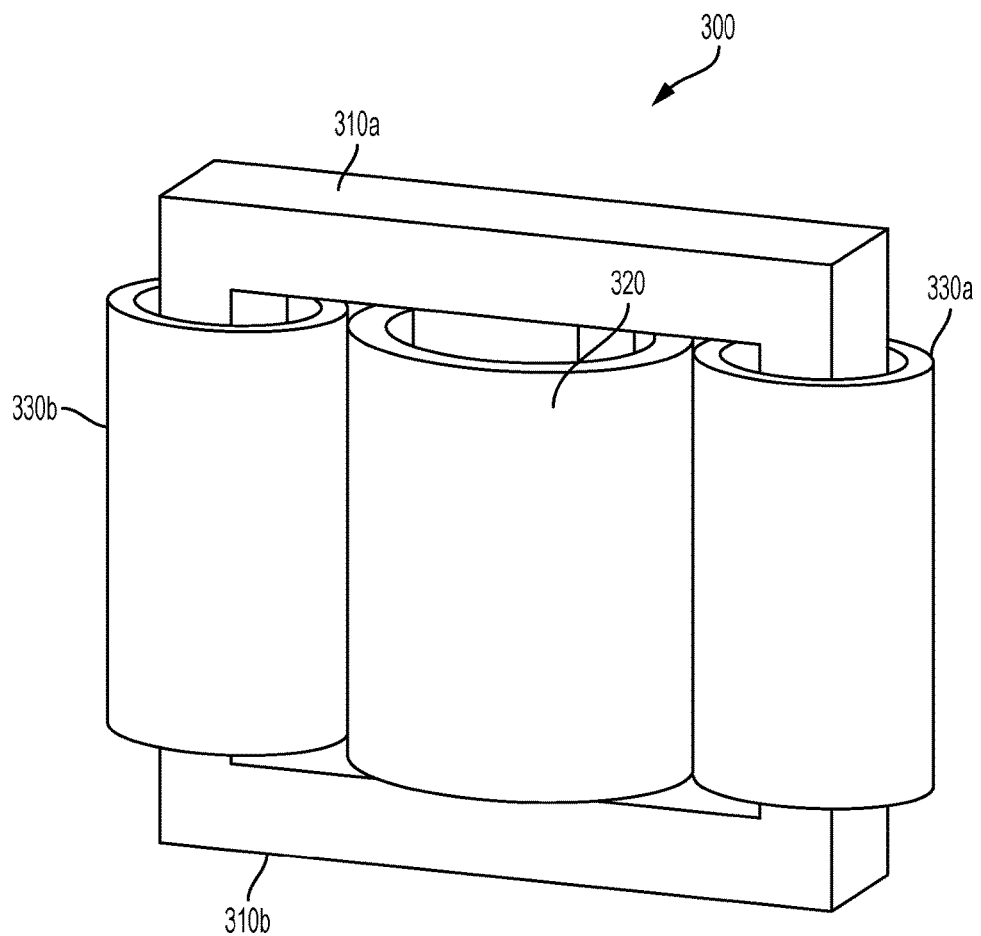
FIG. 3B is a schematic representation of the aspect of a variable inductor as depicted in FIG. 3A.
Figure 3C:
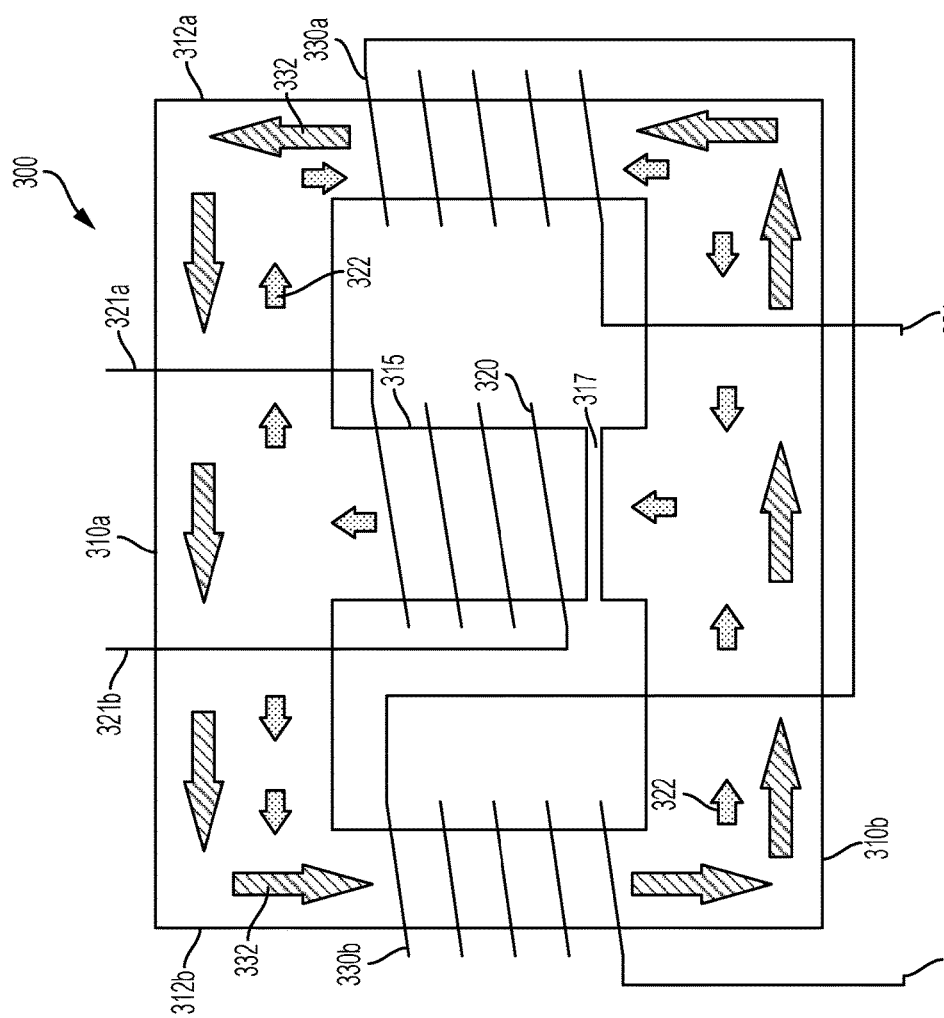
FIG. 3C is a magnetic flux diagram of the aspect of a variable inductor as depicted in FIGS. 3A, B.

FIGS. 3A-3C depict, respectively, a realized version of a variable inductor 300, a perspective view of a model of the variable inductor 300, and a schematic showing the magnetic flux through the components of the variable inductor 300. The variable inductor 300 is composed of a core and three windings. The core is configured as a three-limbed double-E core having a first outer limb 312a, a second outer limb 312b, and a medial limb 315. The first outer limb 312a and the second outer limb 31b are each directly coupled to a first framing portion 310a on a first end of each outer limb, and directly coupled to a second framing portion 310b on a second end of each outer limb. The medial limb 315 is directly coupled to the first framing portion 310a on a first end, but is not directly coupled to the second framing portion 310b. Instead, the medial limb 315 is separated from the second framing portion 310b by an air gap 317.

The three windings of the variable inductor 300 comprise an inductor winding 320, wound about the medical limb 315, and two control windings, in which the first control winding 330a is wound about the first outer limb 312a, and the second control winding 330b is wound about the second outer limb 312b. The two control windings 330a,b are connected in series so that the direction of the flux generated by the first control winding 330a is aligned with the direction of the flux generated by the second control winding 330b. Referring to FIG. 2, a first end 321a of the inductor winding 320 may be configured to receive the power signal 222 from the power amplifier 220 and a second end 321b of the inductor winding 320 may transmit the inductor signal 252 to the input of the transducer 240. Similarly, the first end 331a and the second end 331b of the control winding (together, 330a,b) may be configured to receive a control signal 217 (including a signal source line and a signal return line) from the controller 210.

The dimension of the air gap 317 defines the maximum current that can run through the inductor without saturation of the magnetic core. The magnetic field H in a core having a magnetic path length $l_c$ and gap length $l_g$ with current I passing through a coil of N turns is given by:

$$H = \frac{Nl}{l_c + \mu_r l_g} \approx \frac{Nl}{\mu_r l_g} < H_s \qquad \text{Eq. 1}$$

where $\mu_r$ is the relative magnetic permeability of the core material relative to vacuum.

Figure 4:
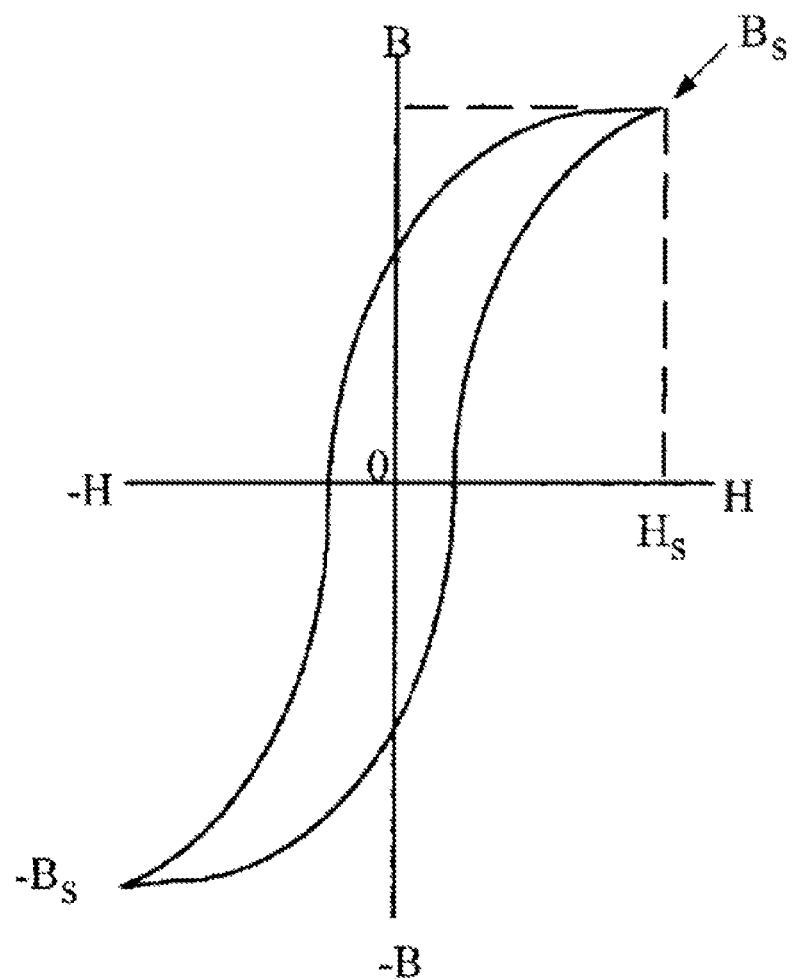
FIG. 4 is an example of a magnetic flux density versus magnetizing force diagram

The magnetic field H should be smaller than the maximum magnetic field value $H_s$ as determined from an H-B diagram (a diagram of the flux density B versus magnetic field intensity H, see FIG. 4) for the core material. For values of H near or above $H_s$, the core material will saturate and the flux density B will be limited to its $B_s$ value. Based on Eq. 1, the maximum air gap length $l_g$ may be determined from the maximum current I and minimum relative magnetic permeability $\mu_r$ of the core material.

The H-B diagram and Faraday law (v=jωNBA) determine the limitation for a ratio of the number of turns N for one volt according to v/N<ωNB$_s$A, where A is the core cross sectional area and ω=2πf (the radial frequency of the current).

The equation for the inductance of gapped core variable inductor has a form:

$$L = \frac{N^2 A}{\frac{l_g}{\mu_r \mu_0} + \frac{l_g}{\mu_0}} = \frac{N^2 A \mu_0}{\frac{l_g}{\mu_r} + l_g} \quad \text{Eq. 2}$$

where $I_c$, $I_g$ are the lengths of core and air gap, respectively, and $\mu_0=4\pi \times 10^{-7}$ (H/m) is the magnetic permeability of air (vacuum). For a typical solid core non-variable inductor, the value of $\tilde{\mu}_r$ is simply $\mu_r$, the relative magnetic permeability of the core material. However, for the variable inductor 300 depicted in FIGS. 3A-3B, the effect of a control current flowing through the control coils 330a,b may be represented by a control current-dependent relative magnetic permeability $\tilde{\mu}_r$.

An inductor current flowing through the inductor coil 320 may result in an inductor magnetic flux 322 flowing through the medial limb 315 and, separately, through each of the two outer limbs 312a,b (via framing portions 310a and 310b). A control current flowing through the control coils 330a,b may result in a control magnetic flux 332 flowing through the outer limbs 312a,b (along with the framing portions 310a,b) of the inductor core. Without being bound by theory, the effect of the control magnetic flux 332 on the inductor magnetic flux 322 may effectively be represented as an alteration of the relative magnetic permeability of the core material $\mu_r$ and may be considered a control current-dependent relative magnetic permeability $\tilde{\mu}_r$.

In Eq. 2, L may depend on the control current-dependent relative magnetic permeability $\tilde{\mu}_r$. As disclosed above, a value of $\tilde{\mu}_r$ may depend on the control magnetic flux 332 induced by the current flowing through the control coil 320 in accordance with H-B diagrams of the core material. A relatively large current flowing through the control coil 320 may induce a relatively large control magnetic flux 332 in the core, resulting in a smaller value of $\tilde{\mu}_r$ and thus a smaller inductance. Similarly, a relatively small current flowing through the control coil 320 may induce a relatively small control magnetic flux 332 in the core, resulting in a larger value of $\tilde{\mu}_r$ and thus a larger inductance.

FIG. 3C depicts a simplified diagram of the magnetic circuit for a variable inductor 300 depicted in FIGS. 3A and 3B. The inductor magnetic flux 322, due to a current flow in the inductor winding 320, may originate in the medial limb 315 and equally flow through each of the first outer limb 312a and the second outer limb 312b (via framing portions 310a and 310b) before completing its path to the medial limb 315. The inductor magnetic flux 322 may return to the medial limb 315 by crossing the air gap 317. The length of the air gap 317 ($l_g$ in Eq. 2) may be calculated to permit a large current flow through the inductor winding 320 without causing field saturation of the magnetic core. At the same time, the control magnetic flux 332 due to current flow in the control windings 330a,b is constrained to the outer limbs 312a,b of the variable inductor 300 and therefore does not cross the air gap 317. In this manner, the variable relative magnetic permeability $\tilde{\mu}_r$ becomes very sensitive to the current flowing through the control coil windings 330a,b and a variable inductor having this design can be controlled by a small current with little thermal loss.

However, as depicted in FIG. 3C, the current flowing through the inductor coil 320 induces an inductor magnetic flux 322 in both of the outer limbs 312a,b. The inductor magnetic flux 322 may thus induce a current into each of the control coils 330a,b. The inductor magnetic flux 322 flowing through the first outer limb 312a may oppose the control magnetic flux 332 in the first outer limb 312a resulting in an induced opposing current through the first control coil 330a. However, the inductor magnetic flux 322 flowing through the second outer limb 312b may align with the control magnetic flux 332 in the second outer limb 312b resulting in an induced aligned current through the second control coil 330b. Control coils 330a and 330b are connected in series. Consequently, any currents induced in the control coils 330a,b will add. If the induced opposing current through the first control coil 330a is identical to the induced aligned current through the second control coil 330b, the sum of the induced currents will be identically zero. However, if the control coils 330a,b are not precisely matched, the sum of the induced currents will not be identically zero, and an additional current component will flow through the control coils 330a,b due to the inductor magnetic flux 322.

It may be understood that the core losses (W) in an inductor may be determined by an area of the hysteresis of the H-B diagram for the core magnetic material. Thermal losses, for example, may depend on a value of the equivalent inductor coil DC resistance, $R_{DC}$ along with the current (I) flowing through the inductor, as calculated according to Eq. 3.

$$W = R_{DC} I^2. \quad \text{Eq. 3}$$

As disclosed above, a mismatch between control coils 330a and 330b may result in an additional current component flowing through the control coils 330a,b. Such an additional current component may result in additional thermal loss according to Eq. 3. Because the thermal loss is proportional to $I^2$, even a small additional amount of current flowing through control coils 330a,b may result in significant additional thermal loss. Therefore, it is advantageous to have a design of a variable inductor that may avoid the problem of additional thermal loss that may occur for a variable inductor 300 designed as depicted in FIGS. 3A-C.

Figure 5A:
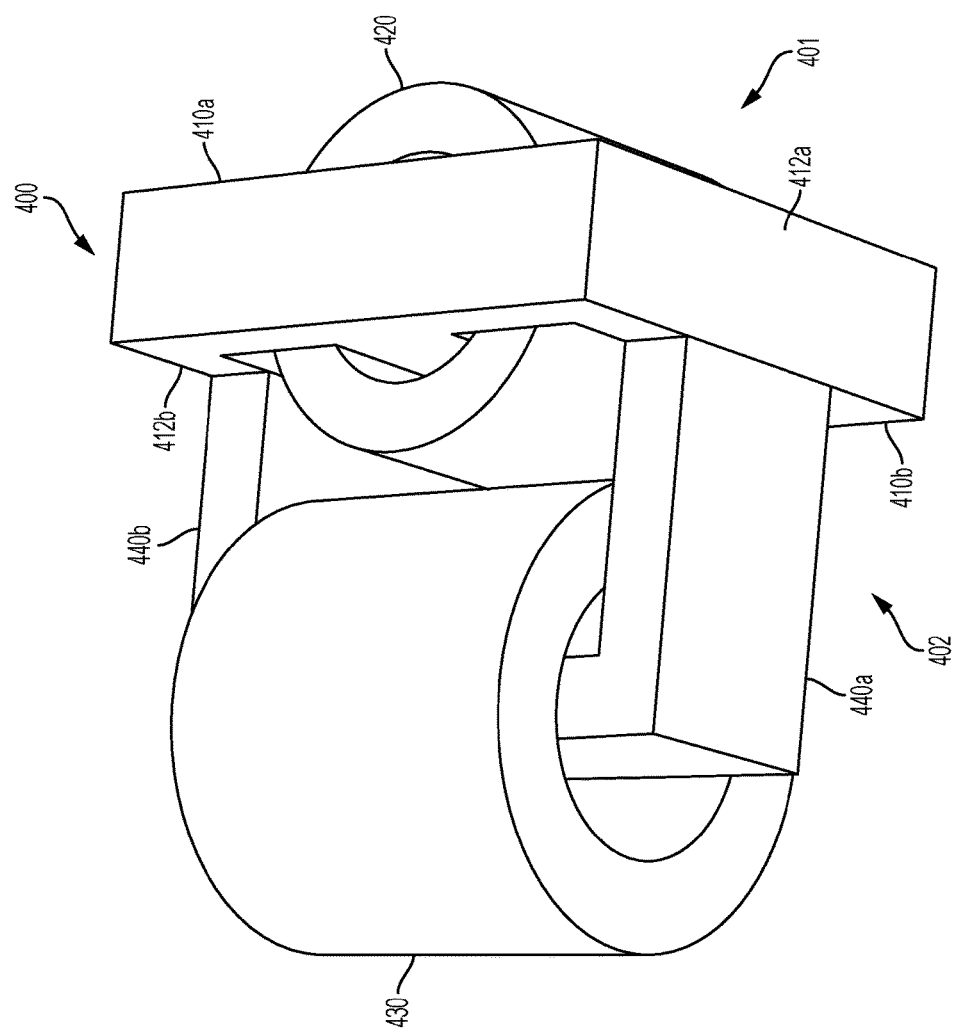
FIG. 5A is a schematic representation of a second aspect of a variable inductor.
Figure 5B:
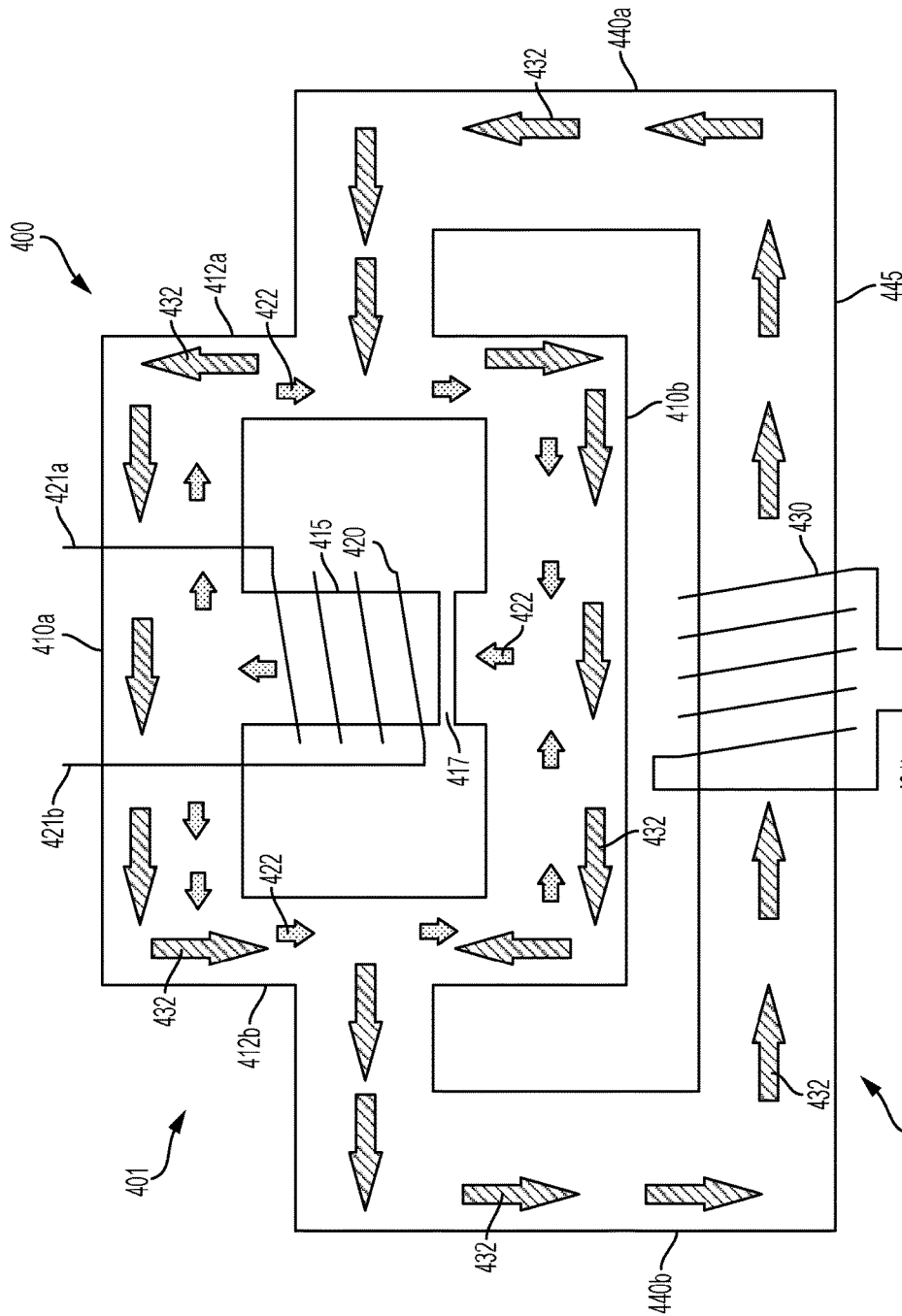
FIG. 5B is a magnetic flux diagram of the aspect of a variable inductor as depicted in FIG. 5A.

FIGS. 5A and 5B depict one aspect of an alternative variable inductor 400.

In FIGS. 5A and 5B, the variable inductor 400 is composed of two linked cores and two windings. A first core 401 is configured as a three-limbed double-E core having a first outer limb 412a, a second outer limb 412b, and a medial limb 415. The first outer limb 412a and the second outer limb 412b are each directly coupled to a first framing portion 410a on a first end of each outer limb 412a,b, and directly coupled to a second framing portion 410b on a second end of each outer limb 412a,b. The medial limb 415 is directly coupled to the first framing portion 410a on a first end, but is not directly coupled to the second framing portion 410b. Instead, the medial limb 415 is separated from the second framing portion 410b by an air gap 417.

The second core 402 may be considered to have the structure of a two-limb core having a control core limb 445 as a first limb of the second core 402 and having the first core 401 forming the second limb of the second core 402. The control core limb 445 may be directly coupled on a first end 440a of the control core limb 445 to the first outer limb 412a of the first core 401. Further, the control core limb 445 may be directly coupled on a second end 440b of the control core limb 445 to the second outer limb 412b of the first core 401. In order to balance the flux flow through the variable inductor 400, the first end 440a of the control core limb 445 may be coupled to about the center of first outer limb 412a of the first core 401 and the second end 440b of the control core limb 445 may be coupled to about the center of the second outer limb 412b of the first core 401.

In the aspect of the variable inductor 400 depicted in FIG. 5A, the limbs of the first core 401 (medial limb 415 and outer limbs 412a and 412b) are essentially co-planar. However, the control core limb 445 may be disposed on a plane orthogonal to the plane defined by the limbs of the first core 401. It may be understood that the relative geometry of the first core 401 with respect to the control core limb 445 as depicted in FIG. 5A is not limiting, and that the physical disposition of the first core 401 with respect to the control core limb 445 may have any geometry suitable for the proper functioning of the variable inductor 400.

The two windings of the variable inductor 400 comprise an inductor winding 420, wound about the medial limb 415, and a single control winding 430 wound about the control core limb 445. Referring to FIG. 2, a first end 421a of the inductor winding 420 may be configured to receive the power signal 222 from the power amplifier 220 and a second end 421b of the inductor winding 420 may transmit the inductor signal 252 to the input of the transducer 240. Similarly, the first end 431a of the control winding 430 and the second end 431b of the control winding 430 together may be configured to receive a control signal 217 (including a signal source line and a signal return line) from the controller 210.

An inductor current flowing through the inductor coil 420 may result in an inductor magnetic flux 422 flowing through the medial limb 415 and, separately, through the two outer limbs 412a,b (via framing portions 410a and 410b). A control current flowing through the control coil 430 may result in a control magnetic flux 432 flowing through the control core limb 445 as well as through the outer limbs 412a,b and the two framing portions 410a,b of the first core.

FIG. 5B depicts a simplified diagram of the magnetic circuit for a variable inductor 400 depicted in FIG. 5A. The inductor magnetic flux 422, due to a current flow in the inductor winding 420, may originate in the medial limb 415 and equally flow through each of the first outer limb 412a and the second outer limb 412b (along with framing portions 410a,b) before completing its path to the medial limb 415. The inductor magnetic flux 422 may return to the medial limb 415 by crossing the air gap 417. The length of the air gap 417 ($I_g$ in Eq. 2) may be calculated to permit a large current flow through the inductor winding 420 without causing field saturation of the magnetic core. At the same time, the control magnetic flux 432, due to current flow in the control winding 430, is constrained to the control core limb 445 as well as to the outer limbs 412a,b and framing portions 410a,b of the variable inductor 400. The control magnetic flux 432 therefore does not cross the air gap 417. In this manner, the variable relative magnetic permeability $\mu_r$ becomes very sensitive to the current flowing through the control coil 430 and a variable inductor having this design can be controlled by a small current with little thermal loss.

The design of the variable inductor 400 depicted in FIGS. 5A and 5B may be distinguished from the design of the variable inductor 300 depicted in FIGS. 3A-C based on the disposition of the inductor magnetic flux 422 and the control magnetic flux 432 in the respective cores. In the variable inductor 300 depicted in FIG. 3C, the current flowing through the inductor coil 320 induces an inductor magnetic flux 322 in both of the outer limbs 312a,b along with the framing portions 310a,b. The flux path of the inductor magnetic flux 322 is thus similar to the path of the inductor magnetic flux 422.

As depicted in FIG. 3C, the control windings 330a and 330b are also wound on the outer limbs 312a and 312b, respectively. As a result, control windings 330a and 330b are exposed to the inductor magnetic flux 322. The inductor magnetic flux 322 may thus induce a current into each of the control coils 330a,b. However, the variable inductor 400 depicted in FIG. 5B, has the single control coil 430 wound on the control limb 445. In this manner, the control coil 430 is isolated from the inductor magnetic flux 422 and therefore does not receive an induced current due to the inductor magnetic flux 422.

A comparison of the variable inductor 400 depicted in FIGS. 5A, B with the variable inductor 300 depicted in FIGS. 3A-C may reveal a number of benefits of the variable inductor 400 over that of variable inductor 300. Because the control coil 430 is isolated from the inductor magnetic flux 422, no additional current is added to the current flowing through the control coil 430. As a result, no additional thermal losses may be induced in the control coil 430 due to coil pick-up of the inductor magnetic flux 422. This may be especially important since a high voltage supply (of, for example, 1000 v or more) may be used to supply the current to the inductor coil 420.

Additionally, as disclosed above with respect to variable inductor 400, only one control coil 430 is required, as opposed to the two series control coils 330a,b depicted in variable inductor 300. The single control coil 430 therefore inherently has less thermal loss than that of the two control coils 330a,b. Further, because only a single control coil 430 is used, there is no necessity to manufacture two identically matched control coils (such as 330a,b) in order to cancel any induced current resulting from pick-up of the inductor magnetic flux (for example 322 as shown in FIG. 3C and disclosed above).

In yet another benefit, the two-core design of the variable inductor 400 may permit additional design freedom and magnetic tuning of the variable inductor. Because the control limb 445 is separate from the first core 401, the shape and/or size of the control limb 445 may thus differ from the shape and/or size of the limbs (412a,b and 415) forming the first core 401. In one non-limiting example, the control coil 430 can be made longer (or have more turns) than a control coil disposed on either of the outer limbs 412a,b. In some aspects, the cross-sectional area of the control limb 445 may be larger or smaller than the cross-section areas of the limbs (412a,b and 415) of the first core 401. Thus, in another non-limiting example, the control coil 430 may have a larger cross-sectional area when wound on a thicker control limb 445 than may be possible for a control coil wound on one of the limbs (412a,b and 415) of the first core 401. A further benefit may be found in adjusting the distance between the control limb 445 and the first core 401. A larger distance may permit the use of a thicker wire (smaller wire gauge) for the control coil 430 than may be possible for a control coil wound on the outer limbs 412a,b of the first core 401.

Figure 6A:
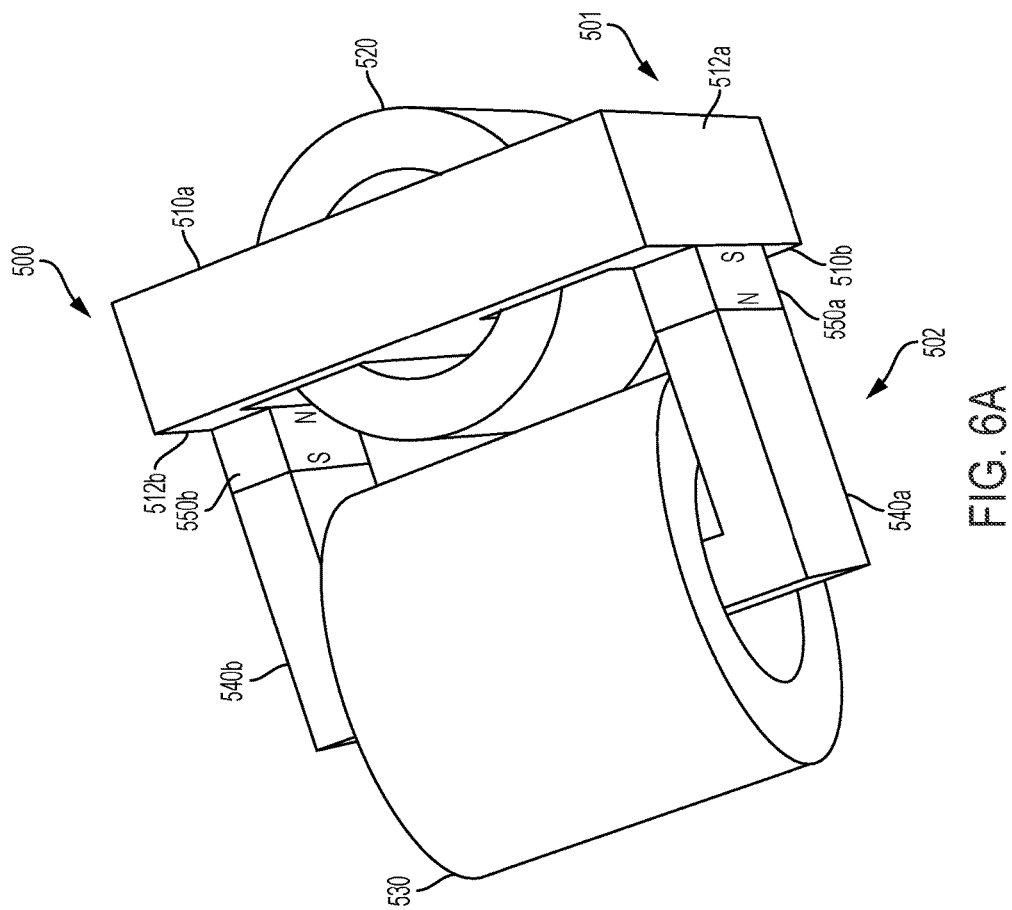
FIG. 6A is a schematic representation of a third aspect of a variable inductor.
Figure 6B:
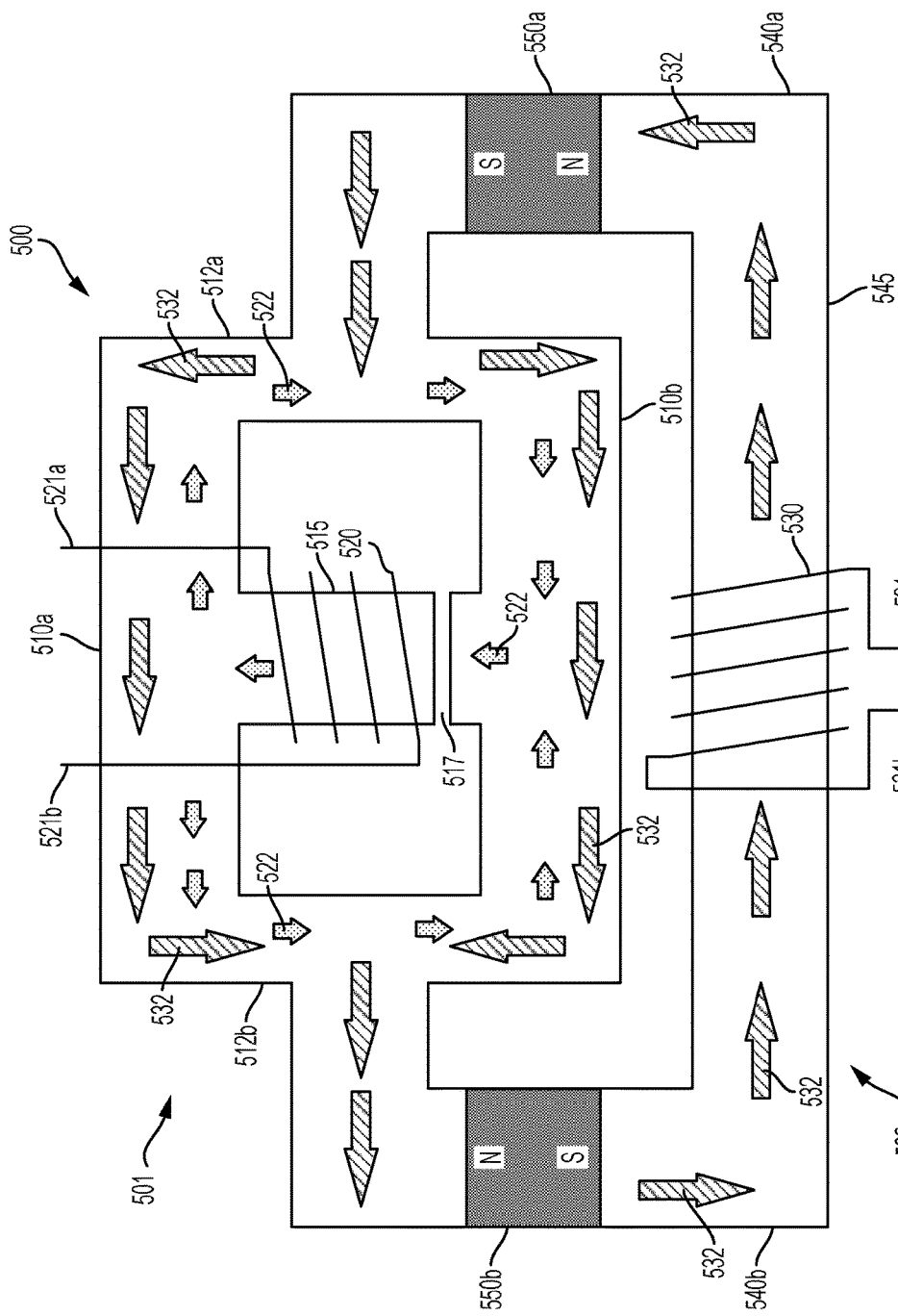
FIG. 6B is a magnetic flux diagram of the aspect of a variable inductor as depicted in FIG. 6A.

FIGS. 6A and 6B depict another aspect of a variable inductor 500 that has many of the advantages of the variable inductor 400 as depicted in FIGS. 5A and 5B.

In FIGS. 6A and 6B, the variable inductor 500 is composed of two linked cores and two windings. A first core 501 is configured as a three-limbed double-E core having a first outer limb 512a, a second outer limb 512b, and a medial limb 515. The first outer limb 512a and the second outer limb 512b are each directly coupled to a first framing portion 510a on a first end of each outer limb 512a,b, and directly coupled to a second framing portion 510b on a second end of each outer limb 512a,b. The medial limb 515 is directly coupled to the first framing portion 510a on a first end, but is not directly coupled to the second framing portion 510b. Instead, the medial limb 515 is separated from the second framing portion 510b by an air gap 517.

The second core 502 may be considered to have the structure of a two-limb core having a control core limb 545 as a first limb of the second core 502 and having the first core 501 forming the second limb of the second core 502. The control core limb 545 may be coupled on a first end 540a of the control core limb 545 to the first outer limb 512a of the first core 501 through a first permanent magnet 550a. Further, the control core limb 545 may be coupled on a second end 540b of the control core limb 545 to the second outer limb 512b of the first core 501 through a second permanent magnet 550b. As depicted in FIG. 6A, the magnetic flux of the first permanent magnet 550a may be aligned with the magnetic flux of the second permanent magnet 550b. In order to balance the flux flow through the variable inductor 500, the first end 540a of the control core limb 545 may be coupled to about the center of first outer limb 512a of the first core 501 and the second end 540b of the control core limb 545 may be coupled to about the center of the second outer limb 512b of the first core 501.

While a pair of permanent magnets 550a,b are depicted in FIGS. 6A, B, it may be recognized that the number of permanent magnets incorporated in the variable inductor 500 may include more permanent magnets or fewer permanent magnets. Thus, a single permanent magnet may be incorporated in the variable inductor 500. Alternatively, the number of permanent magnets incorporated in the variable inductor 500 may number more than two. Without limitation, therefore, the number of permanent magnets incorporated in variable inductor 500 may include three magnets, four magnets, or any number of permanent magnets.

In the aspect of the variable inductor 500 depicted in FIG. 6A, the limbs of the first core 501 (medial limb 515 and outer limbs 512a and 512b) are essentially co-planar. However, the control core limb 545 may be disposed on a plane orthogonal to the plane defined by the limbs of the first core 501. It may be understood that the relative geometry of the first core 501 with respect to the control core limb 545 as depicted in FIG. 6A is not limiting, and that the physical disposition of the first core 501 with respect to the control core limb 545 may have any geometry suitable for the proper functioning of the variable inductor 500.

The two windings of the variable inductor 500 comprise an inductor winding 520, wound about the medial limb 515, and a single control winding 530 wound about the control core limb 545. Referring to FIG. 2, a first end 521a of the inductor winding 520 may be configured to receive the power signal 222 from the power amplifier 220 and a second end 521b of the inductor winding 520 may transmit the inductor signal 252 to the input of the transducer 240. Similarly, the first end 531a of the control winding 530 and the second end 531b of the control winding 530 together may be configured to receive a control signal 217 (including a signal source line and a signal return line) from the controller 210.

An inductor current flowing through the inductor coil 520 may result in an inductor magnetic flux 522 flowing through the medial limb 515 and, separately, through the two outer limbs 512a,b (via framing portions 510a and 510b). A control current flowing through the control coil 530 may result in a control magnetic flux 532 flowing through the control core limb 545 as well as through the outer limbs 512a,b and the two framing portions 510a,b of the first core.

FIG. 6B depicts a simplified diagram of the magnetic circuit for a variable inductor 500 depicted in FIG. 6A. The inductor magnetic flux 522, due to a current flow in the inductor winding 520, may originate in the medial limb 515 and equally flow through each of the first outer limb 512a and the second outer limb 512b (along with framing portions 510a,b) before completing its path to the medial limb 515. The inductor magnetic flux 522 may return to the medial limb 515 by crossing the air gap 517. The length of the air gap 517 ($I_g$ in Eq. 2) may be calculated to permit a large current flow through the inductor winding 520 without causing field saturation of the magnetic core. At the same time, the control magnetic flux 532, due to current flow in the control winding 530, is constrained to the control core limb 545 as well as to the outer limbs 512a,b and framing portions 510a,b of the variable inductor 500. The control magnetic flux 532 therefore does not cross the air gap 517. In this manner, the variable relative magnetic permeability $\mu_r$ becomes very sensitive to the current flowing through the control coil 430 and a variable inductor having this design can be controlled by a small current with little thermal loss.

The permanent magnets 550a,b may be incorporated in the variable inductor 500, for example in the control core limb 545 in order to further decrease the thermal losses in the control coil 530. Without being bound by theory, the permanent magnets 550a,b may induce a magnetic flux "offset" to the control magnetic flux 532. The introduction of an "offset" to the control magnetic flux 532 may effectively change the current to the control coil 530 due to flux pick-up by the control coil 530. For example, without any permanent magnets, the current through the control coil 530 may range from 0 to a maximum current $I_m$. The maximum heat loss in the control coil 530, at the maximum current $I_m$ may be about $R_{DC}I^2_m$ (from Eq. 3). The flux offset due to the permanent magnets 550a,b will offset the maximum current through the control coil 530 which may thus range from about $-0.5\ I_m$ to about $+0.5\ I_m$. Again, using Eq. 3, the maximum heat loss of the control coil 530 resulting from the added magnetic flux will be about $0.25\ R_{DC}I^2$. The permanent magnets 550a,b may be advantageously included in the control core limb 545 where the control magnetic flux 532 is separated from the inductor magnetic flux 522 in order to exclude any eddy current losses from the inductor magnetic flux 522.

While various details have been set forth in the foregoing description, it will be appreciated that the various aspects of devices and techniques for controlling the operation of a transducer may be practiced without these specific details. One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Further, while several forms have been illustrated and described, it is not the intention of the applicant to restrict or limit the scope of the appended claims to such detail. Numerous modifications, variations, changes, substitutions, combinations, and equivalents to those forms may be implemented and will occur to those skilled in the art without departing from the scope of the present disclosure. Moreover, the structure of each element associated with the described forms can be alternatively described as a means for providing the function performed by the element. Also, where materials are disclosed for certain components, other materials may be used. It is therefore to be understood that the foregoing description and the appended claims are intended to cover all such modifications, combinations, and variations as falling within the scope of the disclosed forms. The appended claims are intended to cover all such modifications, variations, changes, substitutions, modifications, and equivalents.

For conciseness and clarity of disclosure, selected aspects of the foregoing disclosure have been depicted in block diagram form rather than in detail. Some portions of the detailed descriptions provided herein may be presented in terms of instructions that operate on data that is stored in one or more computer memories or one or more data storage devices (e.g. floppy disk, hard disk drive, Compact Disc (CD), Digital Video Disk (DVD), or digital tape). Such descriptions and representations are used by those skilled in the art to describe and convey the substance of their work to others skilled in the art. In general, an algorithm refers to a self-consistent sequence of steps leading to a desired result, where a "step" refers to a manipulation of physical quantities and/or logic states which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities and/or states.

Unless specifically stated otherwise as apparent from the foregoing disclosure, it is appreciated that, throughout the foregoing disclosure, discussions using terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

The foregoing detailed description has set forth various forms of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, and/or examples can be implemented, individually and/or collectively, by a wide range of hardware, software, firmware, or virtually any combination thereof. In one form, several portions of the subject matter described herein may be implemented via an application specific integrated circuits (ASIC), a field programmable gate array (FPGA), a digital signal processor (DSP), or other integrated formats. However, those skilled in the art will recognize that some aspects of the forms disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as one or more program products in a variety of forms, and that an illustrative form of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

In some instances, one or more elements may be described using the expression "coupled" and "connected" along with their derivatives. It should be understood that these terms are not intended as synonyms for each other. For example, some aspects may be described using the term "connected" to indicate that two or more elements are in direct physical or electrical contact with each other. In another example, some aspects may be described using the term "coupled" to indicate that two or more elements are in direct physical or electrical contact. The term "coupled," however, also may mean that two or more elements are not in direct contact with each other, but yet still co-operate or interact with each other. It is to be understood that depicted architectures of different components contained within, or connected with, different other components are merely examples, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated also can be viewed as being "operably connected," or "operably coupled," to each other to achieve the desired functionality, and any two components capable of being so associated also can be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components, and/or electrically interacting components, and/or electrically interactable components, and/or optically interacting components, and/or optically interactable components.

In other instances, one or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

While particular aspects of the present disclosure have been depicted and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "one form," or "a form" means that a particular feature, structure, or characteristic described in connection with the aspect is included in at least one aspect. Thus, appearances of the phrases "in one aspect," "in an aspect," "in one form," or "in an form" in various places throughout the specification are not necessarily all referring to the same aspect. Furthermore, the particular features, structures or characteristics may be combined in any suitable manner in one or more aspects.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory. Further, implementation of at least part of a system for performing a method in one territory does not preclude use of the system in another territory.

All of the above-mentioned U.S. patents, U.S. patent application publications, U.S. patent applications, foreign patents, foreign patent applications, non-patent publications referred to in this specification and/or listed in any Application Data Sheet, or any other disclosure material are incorporated herein by reference, to the extent not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

In summary, numerous benefits have been described which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope.

Various aspects of the subject matter described herein are set out in the following numbered examples:

Example 1

A variable inductor, comprising:
a first core, comprising:
a first outer limb;
a second outer limb;
a medial limb disposed between the first outer limb and the second outer limb;
a first framing portion coupled to a first side of the first outer limb, a first side of the second outer limb, and a first side of the medial limb;
a second framing portion coupled to a second side of the first outer limb and a second side of the second outer limb;
an air gap disposed between a second side of the medial limb and the second framing portion; and
a variable inductor winding wound on the medial limb; and
a second core, comprising:
a control core limb; and
a control winding wound on the control core limb, wherein a first side of the control core limb is coupled to the first outer limb and a second side of the control core limb is coupled to the second outer limb.

Example 2

The variable inductor of Example 1, wherein the first outer limb, the second outer limb, and the medial limb define a first plane and the control core limb is disposed on a second plane orthogonal to the first plane.

Example 3

The variable inductor of any one or more of Example 1 through Example 2, wherein the first side of the control core limb is coupled to a medial portion of the first outer limb and the second side of the control core limb is coupled to a medial portion of the second outer limb.

Example 4

The variable inductor of any one or more of Example 1 through Example 3, further comprising:
a first permanent magnet disposed between the control core limb and the first outer limb; and
a second permanent magnet disposed between the control core limb and the second outer limb.

Example 5

The variable inductor of Example 4, wherein the first permanent magnet has a first magnetization direction, the second permanent magnet has a second magnetization direction, and the first magnetization direction of the first permanent magnet is the same as the second magnetization direction of the second permanent magnet.

Example 6

A control system for a transducer, comprising:
a controller configured to transmit a transducer signal and a control signal, and to receive a return signal;
an amplifier configured to receive the transducer signal and transmit a power signal, wherein the power signal depends at least in part on the transducer signal;
a variable inductor configured to:
receive the power signal at an inductor input;
transmit an inductor signal at an inductor output; and
adjust an electrical characteristic of the inductor signal depending at least in part on the control signal; and
a phase comparator configured to transmit to the controller a comparison signal,
wherein the comparison signal depends at least in part on a comparison of a first signal indicative of a voltage phase of the power signal with a second signal indicative of a current phase of the return signal, and
wherein the control signal depends at least in part on the comparison signal.

Example 7

The control system of Example 6, wherein the transducer signal is a frequency modulated signal.

Example 8

The control system of Example 7, wherein the frequency modulated signal is modulated in a frequency range of 500 Hz to 1000 Hz.

Example 9

The control system of any one or more of Example 6 through Example 8, wherein the electrical characteristic of the inductor signal comprises a voltage phase of the inductor signal.

Example 10

The control system of Example 9, wherein the controller is configured to transmit a control signal that, upon receipt of the control signal by the variable inductor, minimizes a difference between the first signal and the second signal.

Example 11

The control system of any one or more of Example 6 through Example 10, wherein the variable inductor comprises:
  a first core, comprising:
  a first outer limb;
  a second outer limb;
  a medial limb disposed between the first outer limb and the second outer limb;
  a first framing portion coupled to a first side of the first outer limb, a first side of the second outer limb, and a first side of the medial limb;
  a second framing portion coupled to a second side of the first outer limb and a second side of the second outer limb;
  an air gap disposed between a second side of the medial limb and the second framing portion; and
  a variable inductor winding having a first end and a second end, wherein the variable inductor winding is wound on the medial limb; and
  a second core, comprising:
  a control core limb; and
  a control winding having a first end and a second end, wherein the control winding is wound on the control core limb,
wherein a first side of the control core limb is coupled to the first outer limb and a second side of the control core limb is coupled to the second outer limb.

Example 12

The control system of Example 11, wherein the first end of the variable inductor winding is configured to receive the power signal and the first end of the control winding is configured to receive the control signal.

Example 13

The control system of Example 12, wherein the controller is electrically coupled to the second end of the control winding.

Example 14

A system comprising:
  a transducer;
  a controller configured to transmit a transducer signal and a control signal, and to receive a return signal from an output of the transducer;
  an amplifier configured to receive the transducer signal and transmit a power signal to an input of a variable inductor, wherein the power signal depends at least in part on the transducer signal;
  the variable inductor, wherein the variable inductor is configured to:
    receive the power signal at an inductor input;
    transmit an inductor signal at an inductor output to an input of the transducer; and
    adjust an electrical characteristic of the inductor signal depending at least in part on the control signal; and
  a phase comparator configured to transmit to the controller a comparison signal,
  wherein the comparison signal depends at least in part on a comparison of a first signal indicative of a voltage phase of the power signal with a second signal indicative of a current phase of the return signal from the transducer, and
  wherein the control signal depends at least in part on the comparison signal.

Example 15

The system of Example 14, wherein the electrical characteristic of the inductor signal comprises a voltage phase of the power signal.

Example 16

The system of Example 15, wherein the controller is configured to transmit a control signal that, upon receipt of the control signal by the variable inductor, minimizes a difference between the first signal and the second signal.

Example 17

The system of Example 16, wherein the variable inductor is configured to minimize a difference between the voltage phase of the inductor signal and the current phase of the return signal from the transducer upon receipt, by the variable inductor, of the control signal from the controller.

Example 18

The system of any one or more of Example 14 through Example 17, wherein the variable inductor comprises:
  a first core, comprising:
  a first outer limb;
  a second outer limb;
  a medial limb disposed between the first outer limb and the second outer limb;
  a first framing portion coupled to a first side of the first outer limb, a first side of the second outer limb, and a first side of the medial limb;
  a second framing portion coupled to a second side of the first outer limb and a second side of the second outer limb;
  an air gap disposed between a second side of the medial limb and the second framing portion; and
  a variable inductor winding having a first end and a second end, wherein the variable inductor winding is wound on the medial limb; and
  a second core, comprising:
  a control core limb; and a control winding having a first end and a second end, wherein the control winding is wound on the control core limb, wherein a first side of the control core limb is coupled to the first outer limb and a second side of the control core limb is coupled to the second outer limb.

Example 19

The system of Example 18, wherein the first end of the variable inductor winding is configured to receive the power signal and the second end of the variable inductor winding is configured to transmit the inductor signal to an input of the transducer.

Example 20

The system of any one or more of Example 18 through Example 19, wherein the first end of the control winding is configured to receive the control signal.

Example 21

The system of any one or more of Example 18 through Example 20, wherein the controller is electrically coupled to the second end of the control winding.

Example 22

A method of controlling a transducer, the method comprising:

transmitting, by a controller, a transducer signal to an amplifier, wherein the amplifier, in response to receiving the transducer signal, transmits a power signal to a variable inductor having a variable inductor output electrically coupled in series with an input of the transducer;

receiving, by the controller, a return signal from an output of the transducer;

receiving, by the controller, a comparison signal from a phase comparator, wherein the comparison signal depends at least in part on a comparison of a first signal indicative of a voltage phase of the power signal with a second signal indicative of a current phase of the return signal from the output of the transducer; and transmitting, by the controller, a control signal to the variable inductor, wherein the variable inductor, in response to receiving the control signal, adjusts an electrical characteristic of an output signal of the variable inductor.

Example 23

The method of Example 22, wherein transmitting, by a controller, a transducer signal to an amplifier comprises transmitting, by a controller, a frequency modulated signal to an amplifier.

Example 24

The method of Example 23, further comprising modulating, by the controller, the frequency modulated signal in a frequency range of 500 Hz to 1000 Hz.

Example 25

The method of any one or more of Example 22 through Example 24, wherein transmitting, by the controller, a control signal to the variable inductor, wherein the variable inductor, in response to receiving the control signal, adjusts an electrical characteristic of an output signal of the variable inductor comprises transmitting, by the controller, the control signal to the variable inductor, wherein the variable inductor, in response to receiving the control signal, adjusts a voltage phase of the output signal of the variable inductor.

Example 26

The method of Example 25, wherein transmitting, by the controller, a control signal to the variable inductor, wherein the variable inductor, in response to receiving the control signal, adjusts a voltage phase of the output signal of the variable inductor comprises transmitting, by the controller, the control signal to the variable inductor, wherein the variable inductor, in response to receiving the control signal, adjusts the voltage phase of the output signal of the variable inductor thereby minimizing the comparison signal.

What is claimed is:

1. A control system for a transducer, comprising:
    a controller configured to transmit a transducer signal and a control signal, and to receive a return signal;
    an amplifier configured to receive the transducer signal and transmit a power signal, wherein the power signal depends at least in part on the transducer signal;
    a variable inductor configured to:
        receive the power signal at an inductor input;
        transmit an inductor signal at an inductor output; and
        adjust an electrical characteristic of the inductor signal depending at least in part on the control signal; and
    a phase comparator configured to transmit to the controller a comparison signal,
    wherein the comparison signal depends at least in part on a comparison of a first signal indicative of a voltage phase of the power signal with a second signal indicative of a current phase of the return signal, and
    wherein the control signal depends at least in part on the comparison signal.

2. The control system of claim 1, wherein the transducer signal is a frequency modulated signal.

3. The control system of claim 2, wherein the frequency modulated signal is modulated in a frequency range of 500 Hz to 1000 Hz.

4. The control system of claim 1, wherein the electrical characteristic of the inductor signal comprises a voltage phase of the inductor signal.

5. The control system of claim 4, wherein the controller is configured to transmit a control signal that, upon receipt of the control signal by the variable inductor, minimizes a difference between the first signal and the second signal.

6. The control system of claim 1, wherein the variable inductor comprises:
    a first core, comprising:
        a first outer limb;
        a second outer limb;
        a medial limb disposed between the first outer limb and the second outer limb;
        a first framing portion coupled to a first side of the first outer limb, a first side of the second outer limb, and a first side of the medial limb;
        a second framing portion coupled to a second side of the first outer limb and a second side of the second outer limb;
        an air gap dispose between a second side of the medial limb and the second framing portion; and a variable inductor winding having a first end and a second end, wherein the variable inductor winding is wound on the medial limb; and a second core, comprising:
  a control core limb; and
  a control winding having a first end and a second end, wherein the control winding is wound on the control core limb,
wherein a first side of the control core limb is coupled to the first outer limb and a second side of the control core limb is coupled to the second outer limb.

7. The control system of claim 6, wherein the first end of the variable inductor winding is configured to receive the power signal and the first end of the control winding is configured to receive the control signal.

8. The control system of claim 7, wherein the controller is electrically coupled to the second end of the control winding.

9. A system comprising:
a transducer;
a controller configured to transmit a transducer signal and a control signal, and to receive a return signal from an output of the transducer;
an amplifier configured to receive the transducer signal and transmit a power signal to an input of a variable inductor, wherein the power signal depends at least in part on the transducer signal;
the variable inductor, wherein the variable inductor is configured to:
  receive the power signal at an inductor input;
  transmit an inductor signal at an inductor output to an input of the transducer; and
  adjust an electrical characteristic of the inductor signal depending at least in part on the control signal; and
a phase comparator configured to transmit to the controller a comparison signal,
wherein the comparison signal depends at least in part on a comparison of a first signal indicative of a voltage phase of the power signal with a second signal indicative of a current phase of the return signal from the transducer, and
wherein the control signal depends at least in part on the comparison signal.

10. The system of claim 9, wherein the electrical characteristic of the inductor signal comprises a voltage phase of the inductor signal.

11. The system of claim 10, wherein the controller is configured to transmit a control signal that, upon receipt of the control signal by the variable inductor, minimizes a difference between the first signal and the second signal.

12. The system of claim 11, wherein the variable inductor is configured to minimize a difference between the voltage phase of the inductor signal and the current phase of the return signal from the transducer upon receipt, by the variable inductor, of the control signal from the controller.

13. The system of claim 9, wherein the variable inductor comprises:
a first core, comprising:
  a first outer limb;
  a second outer limb;
  a medial limb disposed between the first outer limb and the second outer limb;
  a first framing portion coupled to a first side of the first outer limb, a first side of the second outer limb, and a first side of the medial limb;
  a second framing portion coupled to a second side of the first outer limb and a second side of the second outer limb;
  an air gap disposed between a second side of the medial limb and the second framing portion; and
  a variable inductor winding having a first end and a second end, wherein the variable inductor winding is wound on the medial limb; and
a second core, comprising:
  a control core limb; and
  a control winding having a first end and a second end, wherein the control winding is wound on the control core limb,
wherein a first side of the control core limb is coupled to the first outer limb and a second side of the control core limb is coupled to the second outer limb.

14. The system of claim 13, wherein the first end of the variable inductor winding is configured to receive the power signal and the second end of the variable inductor winding is configured to transmit the inductor signal to an input of the transducer.

15. The system of claim 13, wherein the first end of the control winding is configured to receive the control signal.

16. The system of claim 13, wherein the controller is electrically coupled to the second end of the control winding.

17. A method of controlling a transducer, the method comprising:
transmitting, by a controller, a transducer signal to an amplifier, wherein the amplifier, in response to receiving the transducer signal, transmits a power signal to a variable inductor having a variable inductor output electrically coupled in series with an input of the transducer;
receiving, by the controller, a return signal from an output of the transducer;
receiving, by the controller, a comparison signal from a phase comparator, wherein the comparison signal depends at least in part on a comparison of a first signal indicative of a voltage phase of the power signal with a second signal indicative of a current phase of the return signal from the output of the transducer; and
transmitting, by the controller, a control signal to the variable inductor, wherein the variable inductor, in response to receiving the control signal, adjusts an electrical characteristic of an output signal of the variable inductor.

18. The method of claim 17, wherein transmitting, by a controller, a transducer signal to an amplifier comprises transmitting, by a controller, a frequency modulated signal to an amplifier.

19. The method of claim 18, further comprising modulating, by the controller, the frequency modulated signal in a frequency range of 500 Hz to 1000 Hz.

20. The method of claim 17, wherein transmitting, by the controller, a control signal to the variable inductor, wherein the variable inductor, in response to receiving the control signal, adjusts an electrical characteristic of an output signal of the variable inductor comprises transmitting, by the controller, the control signal to the variable inductor, wherein the variable inductor, in response to receiving the control signal, adjusts a voltage phase of the output signal of the variable inductor.

21. The method of claim 20, wherein transmitting, by controller, a control signal to the variable inductor, wherein the variable inductor, in response to receiving the control signal, adjusts a voltage phase of the output signal of the variable inductor comprises transmitting, by the controller, the control signal to the variable inductor, wherein the variable inductor, in response to receiving the control signal, adjusts the voltage phase of the output signal of the variable inductor thereby minimizing the comparison signal.

22. The method of claim 17, wherein transmitting, by a controller, a transducer signal to an amplifier, wherein the amplifier, in response to receiving the transducer signal, transmits a power signal to a variable inductor having a variable inductor output electrically coupled in series with an input of the transducer comprises transmitting, by a controller, a transducer signal to an amplifier, wherein the amplifier, in response to receiving the transducer signal, transmits a power signal to a variable inductor having a variable inductor output electrically coupled in series with an input of the transducer, and wherein the variable inductor comprises:
  a first core, comprising:
    a first outer limb;
    a second outer limb;
    a medial limb disposed between the first outer limb and the second outer limb;
    a first framing portion coupled to a first side of the first outer limb, a first side of the second outer limb, and a first side of the medial limb;
    a second framing portion coupled to a second side of the first outer limb and a second side of the second outer limb;
    an air gap disposed between a second side of the medial limb and the second framing portion; and
    a variable inductor winding having a first end and a second end, wherein the variable inductor winding is wound on the medial limb; and
  a second core, comprising:
    a control core limb; and
    a control winding having a first end and a second end, wherein the control winding is wound on the control core limb,
  wherein a first side of the control core limb is coupled to the first outer limb and a second side of the control core limb is coupled to the second outer limb.

* * * * *